(12) United States Patent
Nagaoka et al.

(10) Patent No.: US 8,528,320 B2
(45) Date of Patent: Sep. 10, 2013

(54) SYSTEM FOR EXHAUST GAS PURIFICATION AND METHOD OF CONTROLLING THE SAME

(75) Inventors: Daiji Nagaoka, Fujisawa (JP); Teruo Nakada, Fujisawa (JP); Hiroyuki Yuza, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 364 days.

(21) Appl. No.: 12/736,809

(22) PCT Filed: Apr. 15, 2009

(86) PCT No.: PCT/JP2009/057560
§ 371 (c)(1),
(2), (4) Date: Nov. 12, 2010

(87) PCT Pub. No.: WO2009/139256
PCT Pub. Date: Nov. 19, 2009

(65) Prior Publication Data
US 2011/0061366 A1  Mar. 17, 2011

(30) Foreign Application Priority Data
May 13, 2008  (JP) .................... 2008-126390

(51) Int. Cl.
*F01N 3/00* (2006.01)
*F01N 3/10* (2006.01)

(52) U.S. Cl.
USPC ........... 60/286; 60/274; 60/295; 60/300; 60/301; 60/303

(58) Field of Classification Search
USPC ........... 60/274, 286, 295, 299, 300, 301, 60/303, 311, 324
See application file for complete search history.

(56) References Cited

U.S. PATENT DOCUMENTS
2006/0008397 A1  1/2006  Bruck
2009/0019836 A1*  1/2009  Nagaoka et al. ............... 60/285

FOREIGN PATENT DOCUMENTS
JP  2005-199179  7/2005
JP  2006-515401  5/2006
JP  2007-198283  8/2007
WO  WO 2006123510 A1 *  11/2006

OTHER PUBLICATIONS

Patent Abstracts of Japan, Publication No. 2007-198283, Published Aug. 9, 2007.
Patent Abstracts of Japan, Publication No. 2005-199179, Published Jul. 28, 2005.
International Search Report dated Jul. 14, 2009 in PCT/JP2009/057560.
Patent Family Report dated Sep. 7, 2010 for Japanese Publication No. 2006-515401.

* cited by examiner

*Primary Examiner* — Kenneth Bomberg
*Assistant Examiner* — Audrey K Bradley
(74) *Attorney, Agent, or Firm* — Staas & Halsey LLP

(57) ABSTRACT

A system for exhaust gas purification including, in an exhaust passage of an internal combustion engine in order from an upstream side: a device for direct injection into the exhaust pipe, an oxidation catalyst, and at least one of a catalyst for NOx removal and a catalyzed diesel particulate filter. A support of the oxidation catalyst is a metallic material or a material having a specific heat not higher than that of the metallic material, and has a structure that mixes the exhaust gas. Regeneration of the NOx occlusion/reduction type catalyst by NOx removal and the forced regeneration of the catalyzed diesel particulate filter by particulate matter removal can occur even when the engine is operated under low-load conditions.

4 Claims, 7 Drawing Sheets

SYSTEM FOR EXHAUST GAS PURIFICATION AND METHOD OF CONTROLLING THE SAME

This application claims the benefit under U.S.C. Section 371, of PCT International Application No. PCT/JP2009/057560, filed Apr. 15, 2009 and Japanese Application No. 2008-126390 filed May 13, 2008, the contents of which are incorporated herein by reference.

TECHNICAL FIELD

The present invention relates to a system for exhaust gas purification having at least one of a NOx occlusion/reduction type catalyst and a catalyzed diesel particulate filter ("DPF"), and a method of controlling the same which enable implementation of regeneration control by NOx removal for restoring the NOx occlusion capacity of the NOx occlusion/reduction type catalyst and forced regeneration control by particulate matter ("PM") removal for restoring the PM collection capability of the catalyzed DPF even when an operation condition of an internal combustion engine is a low-load condition.

BACKGROUND ART

Among catalysts for NOx removal (DeNOx catalysts) used for purification of NOx in exhaust gas emitted from diesel engines, in-cylinder gasoline direct injection engines (GDI), and the like, there is a NOx occlusion/reduction type catalyst called a lean NOx trap (LNT). This catalyst is formed by supporting an occlusion material such as an alkali metal (for example, potassium K or the like) or an alkaline earth metal (for example, barium Ba or the like) together with a noble metal such as platinum Pt.

In an air-fuel ratio lean state where exhaust gas is oxygen-rich, the NOx occlusion/reduction type catalyst oxidizes NO in the exhaust gas, and occludes NOx in the form of a nitrate salt of the occlusion material. Meanwhile, in an air-fuel ratio rich state where the exhaust gas contains almost no oxygen, the catalyst releases the occluded NOx, and reduces the released NOx with a reducing agent such as hydrocarbons ("HCs") or CO by way of a three-way catalyst function. By way of these functions, the catalyst reduces the amount of NOx.

In regeneration control by NOx removal for restoring the NOx occlusion capacity of the NOx occlusion/reduction type catalyst, when the air-fuel ratio of exhaust gas is brought into a rich state, a reducing agent such as fuel is supplied to the NOx occlusion/reduction type catalyst. The supply of the reducing agent is achieved by performing post-injection in which fuel is additionally injected after main injection during in-cylinder fuel injection control, or by performing in-exhaust pipe direct injection in which fuel is injected directly into an exhaust pipe.

In addition, there are continuous regeneration-type diesel particulate filter devices (DPF devices) for collecting PMs (particulate matters) emitted from diesel engines with filters. In such a continuous regeneration DPF device, PMs collected on the filter are continuously combusted for purification when the temperature of exhaust gas is relatively high (approximately 350° C. or above). When, however, the temperature of the exhaust gas is low, the temperature of an oxidation catalyst or a PM oxidation catalyst supported on the filter is lowered, and thus the oxidation catalyst or the PM oxidation catalyst is not activated. This makes it difficult to self-regenerate the filter through oxidation of the PMs. For this reason, clogging due to deposition of PMs on the filter progresses, causing a problem of exhaust pressure rise.

In this respect, once the amount of PMs deposited on the filter exceeds a predetermined amount, forced regeneration by PM removal is performed. In the forced regeneration by PM removal, the temperature of exhaust gas is forcibly raised, and the collected PMs are removed by forced combustion. In the forced regeneration by PM removal, post injection or in-exhaust pipe direct injection is performed to supply unburned HCs (hydrocarbons) such as a fuel into the exhaust gas, and the supplied unburned HCs are combusted on an oxidation catalyst disposed on the upstream side of the filter or on an oxidation catalyst supported on the filter. By utilizing the heat of the oxidation reaction, the temperatures of exhaust gas at an inlet of the filter and on a surface of the filter are raised. Thereby, the temperature of the filter is raised to a temperature not lower than a temperature at which PMs accumulated on the filter are combusted, and thus PMs are removed by combustion.

There exist post injection and in-exhaust pipe direct injection as methods for supplying unburned HCs into an exhaust pipe as described above. The in-exhaust pipe direct injection is advantageous in that the supply amount of unburned HCs can be adjusted without affecting the combustion in a cylinder. Hence, the in-exhaust pipe direct injection in which fuel is directly injected into an exhaust pipe is being put into practical use for injecting a reducing agent for a NOx occlusion/reduction type catalyst, or for raising the temperature of exhaust gas for the purpose of forcibly combusting PMs collected on a DPF.

However, in a case of the in-exhaust pipe direct injection, even when fuel is injected into an exhaust pipe, no oxidation reaction occurs at a temperature which is not higher than an activation temperature of a NOx occlusion/reduction type catalyst and an oxidation catalyst, as in the case of the post injection. The injected fuel passes through these catalysts, and outflows, causing white smoke and the like. In such a case, since the unburned HCs are not gasified in a case of the in-exhaust pipe direct injection, unlike a case of the post injection, white smoke is more likely to be caused in the case of the in-exhaust pipe direct injection than in a case of the post injection. For this reason, the range where the in-exhaust pipe direct injection can be used is limited by the activation temperature of the catalyst, and there is a problem that it is difficult to perform regeneration of a NOx occlusion/reduction type catalyst by NOx removal or forced regeneration of a DPF by PM removal during low-load operation or the like.

Meanwhile, there has been proposed a cell structure as descried in, for example, Japanese patent application Kokai publication No. 2005-199179. The cell structure has an outer wall portion on an outer peripheral surface and a cell structural portion having partition walls forming multiple cells extending from one end face to the other end face inside the outer wall portion. In the cell structure, the cell structural portion is mainly composed of a ceramic material or a metallic material, and the outer wall portion is mainly composed of a ceramic material, so that a heat insulating performance of the outer wall portion is enhanced. This improves the rate of the temperature rise of the cell structural portion, and makes the temperature distribution uniform.

SUMMARY OF THE INVENTION

The present invention has been made in view of the above-described circumstances, and an object of the present invention is to provide a system for exhaust gas purification using at least one of a catalyst for NOx removal and a catalyzed DPF and a method of controlling the same which enable implementation of regeneration of a NOx occlusion/reduction type catalyst by NOx removal or forced regeneration by PM removal of a catalyzed DPF by utilizing an oxidation catalyst having a support formed of a metallic material or a material having a specific heat not higher than that of a metallic material into a structure having a function of mixing exhaust gas even when the operation condition of an internal combustion engine is a low-load condition.

In order to achieve the above-described object, provided is a system for exhaust gas purification including, in the following order from an upstream side of an exhaust passage of an internal combustion engine: a device for direct injection into an exhaust pipe; an oxidation catalyst; and at least one of a catalyst for NOx removal and a catalyzed DPF. In this system, a support of the oxidation catalyst is formed of a metallic material or a material having a specific heat not higher than that of a metallic material into a structure having a function of mixing exhaust gas.

In post injection, unburned fuel injected into a cylinder is gasified, and substantially uniformly mixed with exhaust gas. However, in-exhaust pipe direct injection is different from the post injection in that unburned fuel is not gasified immediately after the injection. For this reason, the unburned fuel needs to be diffused and mixed with the exhaust gas. In the above-described configuration, the oxidation catalyst is configured to have the function of mixing exhaust gas, i.e., a mixer function. Accordingly, the unburned fuel and the exhaust gas are substantially uniformly mixed with each other, when passing through the support of the oxidation catalyst. Here, what is injected by the in-exhaust pipe direct injection in this description is assumed to be unburned fuel. However, in the present invention, what is injected by the in-exhaust pipe direct injection may be fuel, an oxidation promoter other than fuel, a promoter for oxidation of PMs, a NOx reducing agent, or the like.

Besides, the specific heat of the oxidation catalyst as a whole is small, because the support of the oxidation catalyst is formed of the metallic material or the material having a specific heat not higher than that of a metallic material. For this reason, less heat is required for a temperature raise, and thus the temperature of the oxidation catalyst can be rapidly raised. In addition, since the metallic material has a high thermal conductivity, the temperature of the oxidation catalyst is easily made entirely uniform. For this reason, the temperature of the oxidation catalyst can be raised relatively rapidly when the internal combustion engine starts to be operated, and the temperature of the oxidation catalyst can be raised rapidly with a small amount of heat of the oxidation reaction of the unburned fuel.

Accordingly, the mixing function of the oxidation catalyst and the rapid temperature raise lead to gasification of the unburned fuel and easiness of the oxidation reaction thereof. As a result, the NOx reduction reaction and the PM combustion on the downstream side are promoted, and white smoke can be prevented from occurring. Therefore, the regeneration of the NOx occlusion/reduction type catalyst by NOx removal and the forced regeneration of the catalyzed DPF by PM removal can be implemented even when the operation condition of the internal combustion engine is a low-load operation condition.

Specific description is as follows. FIG. 6 shows a case of an oxidation catalyst B of a conventional technique with a cordierite support having a relatively large specific heat. Here, the temperature of exhaust gas rises and drops in a slow acceleration state. However, since the amplitude of the change in temperature, which follows the rise and drop, of the oxidation catalyst is small, an acceleration state of a certain degree is necessary for the temperature of the oxidation catalyst to reach the activation temperature of the catalyst (for example, 200° C.). Meanwhile, in a case of an oxidation catalyst A formed of a support made of a material having a relatively small specific heat, such as a metallic material as in the case of the present invention, since the amplitude of the change in temperature, which follows rise and drop of the temperature of exhaust gas in a slow acceleration state, of the oxidation catalyst is great, a case where the oxidation catalyst reaches an activation temperature of the catalyst is more likely to occur although the period is short. For this reason, the temperature of the oxidation catalyst can be raised by supplying unburned fuel at this timing, and can be kept at a temperature not lower than the activation temperature of the catalyst. As a result, it is possible to raise the temperatures of the exhaust gas, the NOx occlusion/reduction type catalyst, and the catalyzed DPF even when the operation condition of the internal combustion engine is a low-load operation condition.

The system for exhaust gas purification includes an exhaust gas purification control unit which performs: in-exhaust pipe direct injection in a predetermined first supply amount for raising a temperature of the oxidation catalyst when a first index temperature indicative of a temperature of the oxidation catalyst is above a first judgment temperature; in-exhaust pipe direct injection in a predetermined second supply amount for raising a temperature of the exhaust gas when the first index temperature is above a second judgment temperature; and in-exhaust pipe direct injection in a predetermined third supply amount for performing a corresponding one of regeneration by NOx removal and forced regeneration by PM removal when a second index temperature indicative of a temperature of the at least one of the NOx occlusion/reduction type catalyst and the catalyzed DPF reaches a third judgment temperature.

In this configuration, when the first index temperature indicative of the temperature of the oxidation catalyst is above the first judgment temperature, in-exhaust pipe direct injection is preformed in the predetermined first supply amount, which is relatively small. As a result, the temperature of the oxidation catalyst can be raised by the oxidation reaction of the unburned fuel on the oxidation catalyst. After that, when the first index temperature is raised, and exceeds the second judgment temperature, in-exhaust pipe direct injection is performed in the predetermined second supply amount, which is an amount that the oxidation catalyst can oxidize, on the assumption that the temperature of the oxidation catalyst can stably be kept not lower than the activation temperature. The temperature of the exhaust gas can be raised by heat generated in the oxidation reaction of the unburned fuel by the in-exhaust pipe direct injection on the oxidation catalyst. Note that the second judgment temperature is a temperature higher than the first judgment temperature by approximately 10° C. to 30° C.

The predetermined first supply amount is an amount for raising the temperature of the oxidation catalyst itself so that the temperature of the oxidation catalyst can be continuously kept not lower than the activation temperature. The predetermined first supply amount is a relatively small, and is employed for a relatively short period of time until the first index temperature reaches the second judgment temperature. The injection is performed for raising the temperature of the oxidation catalyst. Since the temperature of the exhaust gas is low at this time, injection with a large amount causes white smoke. For this reason, supply amounts commensurate with temperatures and flow rates of exhaust gas are determined in advance, and stored in the exhaust gas purification control unit as map data or the like. Then, the supply amount is calculated at the time of implementation with reference to the data. Specifically, an injectable amount Qb (=Qa×Ca/100) at a current temperature T1 is found from the characteristic curve of FIG. 7, where Qa represents an injection amount oxidizable at a temperature (T2) at which HC light-off is 100% as shown in FIG. 7.

Meanwhile, the predetermined second supply amount is an amount for raising the temperature of the exhaust gas so that the temperature of the NOx occlusion/reduction type catalyst or the catalyzed DPF on the downstream side can be raised, with the temperature of the oxidation catalyst being continuously kept not lower than the activation temperature. Here, the unburned fuel is supplied in the predetermined second supply amount, which is different from the first supply amount. The second supply amount is set to an amount enough to raise the temperatures of the exhaust gas, the NOx occlusion/reduction type catalyst, the catalyzed DPF, and the like. In other words, the second supply amount is also found in accordance with a characteristic curve as shown in FIG. 7, as in the case of the first supply amount.

Moreover, in a case of a system for exhaust gas purification related to the NOx occlusion/reduction type catalyst, when the second index temperature indicative of the temperature of the NOx occlusion/reduction type catalyst reaches the third judgment temperature at which the regeneration by NOx removal is operable, the regeneration by NOx removal can be performed by performing in-exhaust pipe direct injection in the predetermined third supply amount. Meanwhile, in a case of a system for exhaust gas purification related to the catalyzed DPF, when the second index temperature indicative of the temperature of the catalyzed DPF reaches the third judgment temperature at which the forced regeneration by PM removal is operable, the forced regeneration by PM removal can be performed by performing in-exhaust pipe direct injection in the predetermined third supply amount.

Moreover, the system for exhaust gas purification employs: a temperature at which the temperature of the oxidation catalyst becomes 200° C. as the first judgment temperature; a temperature at which the temperature of the oxidation catalyst becomes 220° C. as the second judgment temperature; and for the regeneration by NOx removal, a temperature at which the temperature of the NOx occlusion/reduction type catalyst becomes 250° C. as the third judgment temperature, or for the forced regeneration by PM removal, a temperature at which the temperature of the catalyzed DPF becomes 300° C. as the third judgment temperature. This configuration enables the judgment temperatures to be set at appropriate values, and makes it possible to effectively perform the temperature raise of the oxidation catalyst, and the temperature raise of the exhaust gas, as well as the regeneration by NOx removal or the forced regeneration by PM removal.

Meanwhile, to achieve the above-described object, also provided is a method of controlling a system for exhaust gas purification which includes, in the following order from an upstream side of an exhaust passage of an internal combustion engine, a device for direct injection into the exhaust pipe, an oxidation catalyst, and at least one of a catalyst for NOx removal and a catalyzed DPF, and in which a support of the oxidation catalyst is formed of a metallic material or a material having a specific heat not higher than that of a metallic material into a structure having a function of mixing exhaust gas, the method including: performing in-exhaust pipe direct injection in a predetermined first supply amount for raising a temperature of the oxidation catalyst when a first index temperature indicative of a temperature of the oxidation catalyst is above a first judgment temperature; performing in-exhaust pipe direct injection in a predetermined second supply amount for raising a temperature of the exhaust gas when the first index temperature is above a second judgment temperature; and performing in-exhaust pipe direct injection in a predetermined third supply amount for performing a corresponding one of regeneration by NOx removal and forced regeneration by PM removal when a second index temperature indicative of a temperature of the at least one of the NOx occlusion/reduction type catalyst and the catalyzed DPF reaches a third judgment temperature.

According to the control method, when the first index temperature indicative of the temperature of the oxidation catalyst is above the first judgment temperature, the temperature of the oxidation catalyst can be raised by performing the in-exhaust pipe direct injection in a predetermined first supply amount, which is relatively small. In addition, when the first index temperature is raised, and exceeds the second judgment temperature, which is higher than the first judgment temperature by approximately 10° C. to 30° C., the in-exhaust pipe direct injection is performed in the predetermined second supply amount that the oxidation catalyst can oxidize, so that the temperature of the exhaust gas can be raised by heat of the oxidation reaction of the unburned fuel on the oxidation catalyst.

Moreover, in the case of the system for exhaust gas purification related to the NOx occlusion/reduction type catalyst, when the second index temperature indicative of the temperature of the NOx occlusion/reduction type catalyst reaches the third judgment temperature at which regeneration by NOx removal is operable, the regeneration by NOx removal can be performed by performing in-exhaust pipe direct injection in the predetermined third supply amount. Meanwhile, in the case of the system for exhaust gas purification related to the catalyzed DPF, when the second index temperature indicative of the temperature of the catalyzed DPF reaches the third judgment temperature at which the forced regeneration by PM removal is operable, the forced regeneration by PM removal can be performed by performing the in-exhaust pipe direct injection in the predetermined third supply amount.

In the method of controlling a system for exhaust gas purification, a temperature at which the temperature of the oxidation catalyst becomes 200° C. is employed as the first judgment temperature, a temperature at which the temperature of the oxidation catalyst becomes 220° C. is employed as the second judgment temperature, and for the regeneration by NOx removal, a temperature at which the temperature of the NOx occlusion/reduction type catalyst becomes 250° C. is employed as the third judgment temperature, or for the forced regeneration by PM removal, a temperature at which the temperature of the catalyzed DPF becomes 300° C. is employed as the third judgment temperature. This method enables the judgment temperatures to be set at appropriate values, and makes it possible to effectively perform the temperature raise of the oxidation catalyst, and the temperature raise of the exhaust gas, as well as the regeneration by NOx removal or the forced regeneration by PM removal.

The system for exhaust gas purification using at least one of a catalyst for NOx removal and a catalyzed DPF and the method of controlling the same according to the present invention enable implementation of regeneration by NOx removal and forced regeneration by PM removal even in a case of a low-load driving operation where these regenerations can not be achieved with the conventional technique in which an oxidation catalyst is constituted of a ceramic support, and unburned fuel is supplied by post injection. Thereby, the regeneration by NOx removal and the forced regeneration by PM removal can be implemented in a wider operation range.

DESCRIPTION OF THE EMBODIMENTS

Hereinafter, description will be given of a system for exhaust gas purification and a method of controlling the same of an embodiment according to the present invention with reference to the drawings, while a system for exhaust gas purification with which NOx and PMs are removed for purification of an exhaust gas passing through an exhaust passage of a diesel engine is taken as an example.

Figure 1:
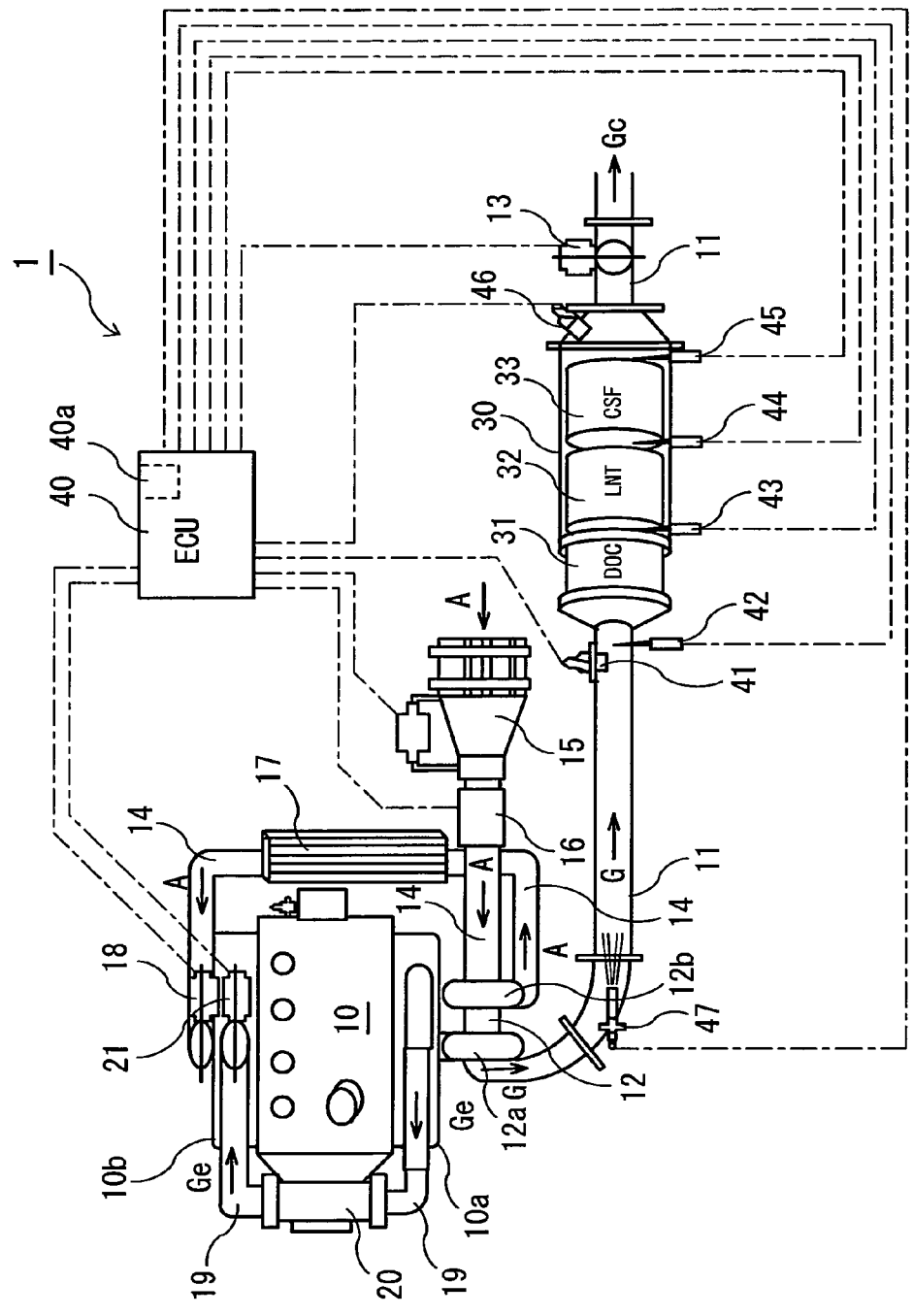
FIG. 1 is a view schematically showing a configuration of a system for exhaust gas purification of an embodiment according to the present invention.

FIG. 1 shows a configuration of a system for exhaust gas purification 1 of the embodiment of the present invention. In the system for exhaust gas purification 1 a turbine 12a of a turbocharger 12, an exhaust gas purification apparatus 30, and an exhaust throttle valve 13 are provided on an exhaust passage 11 of a diesel engine (an internal combustion engine) 10 from the upstream side. The exhaust gas treatment apparatus 30 is constituted by providing an oxidation catalyst (DOC) 31, a NOx occlusion/reduction type catalyst (LNT) 32, and a catalyzed DPF (CSF) 33 with one of an oxidation catalyst and a PM oxidation catalyst being supported thereon, in this order from the upstream side.

The oxidation catalyst 31 is formed by causing rhodium, cerium oxide, platinum, aluminum oxide, or the like to be supported on a support formed of a metallic material into a structure having a function of mixing the exhaust gas. As the structure which has the mixing function, usable are a PE (Perforated) structure (named by EMITEC GmbH, Germany) as shown in FIG. 2, a LS (Longitudinal Structure) structure (named by EMITEC GmbH, Germany) as shown in FIG. 3, or the like.

Figure 2:
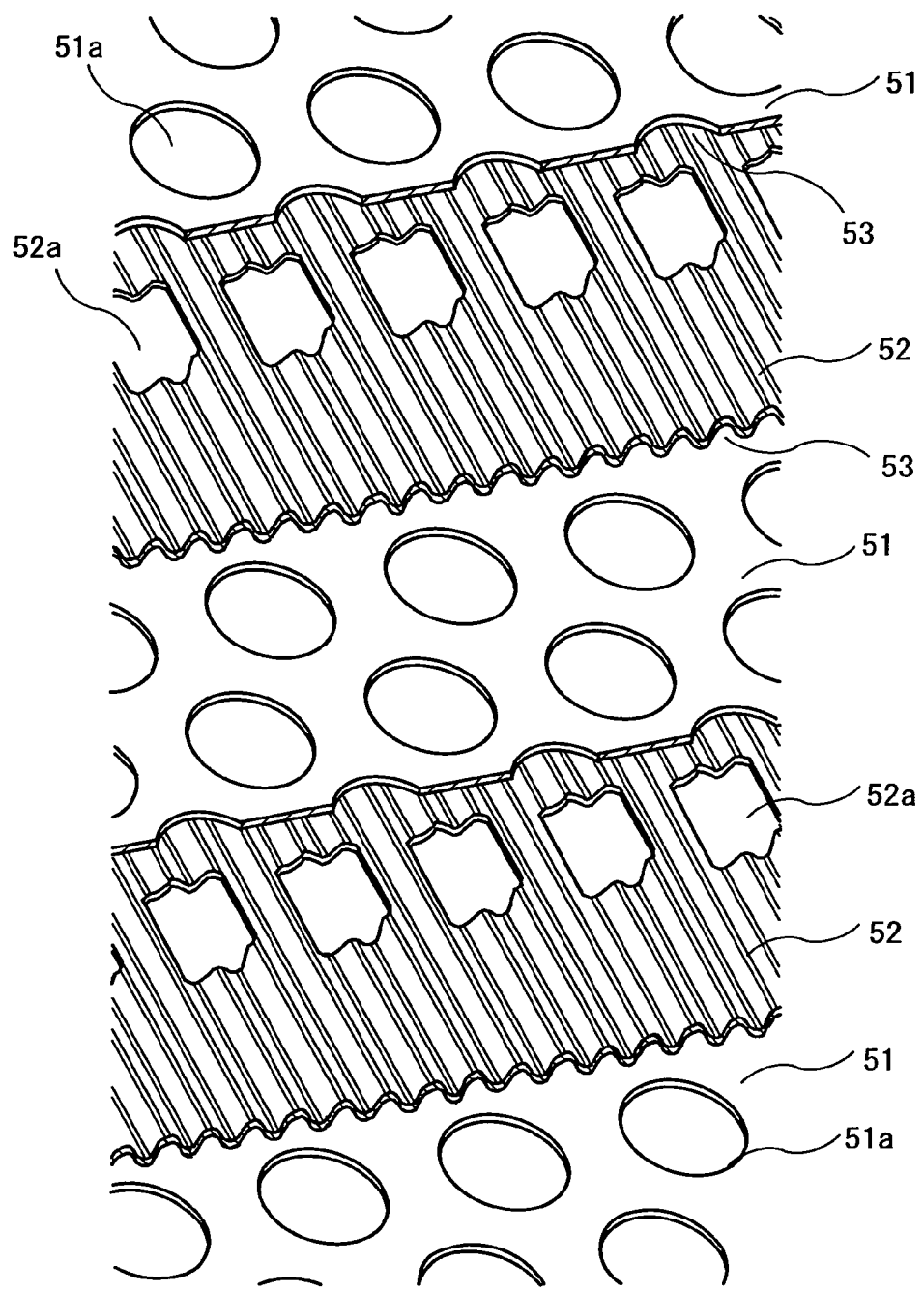
FIG. 2 is a view schematically showing a perforated structure ("PE") in which perforated flat foils and perforated corrugated foils are stacked on each other.

As shown in FIG. 2, in the PE structure, perforated flat foils 51 made of a metal and perforated corrugated foils 52 made of a metal are stacked on each other, so that channels 53 can communicate with each other. The holes 51a and 52a of the perforation have diameters of, for example, approximately 8 mm$\phi$, and the porosity is approximately 35%.

Figure 3:
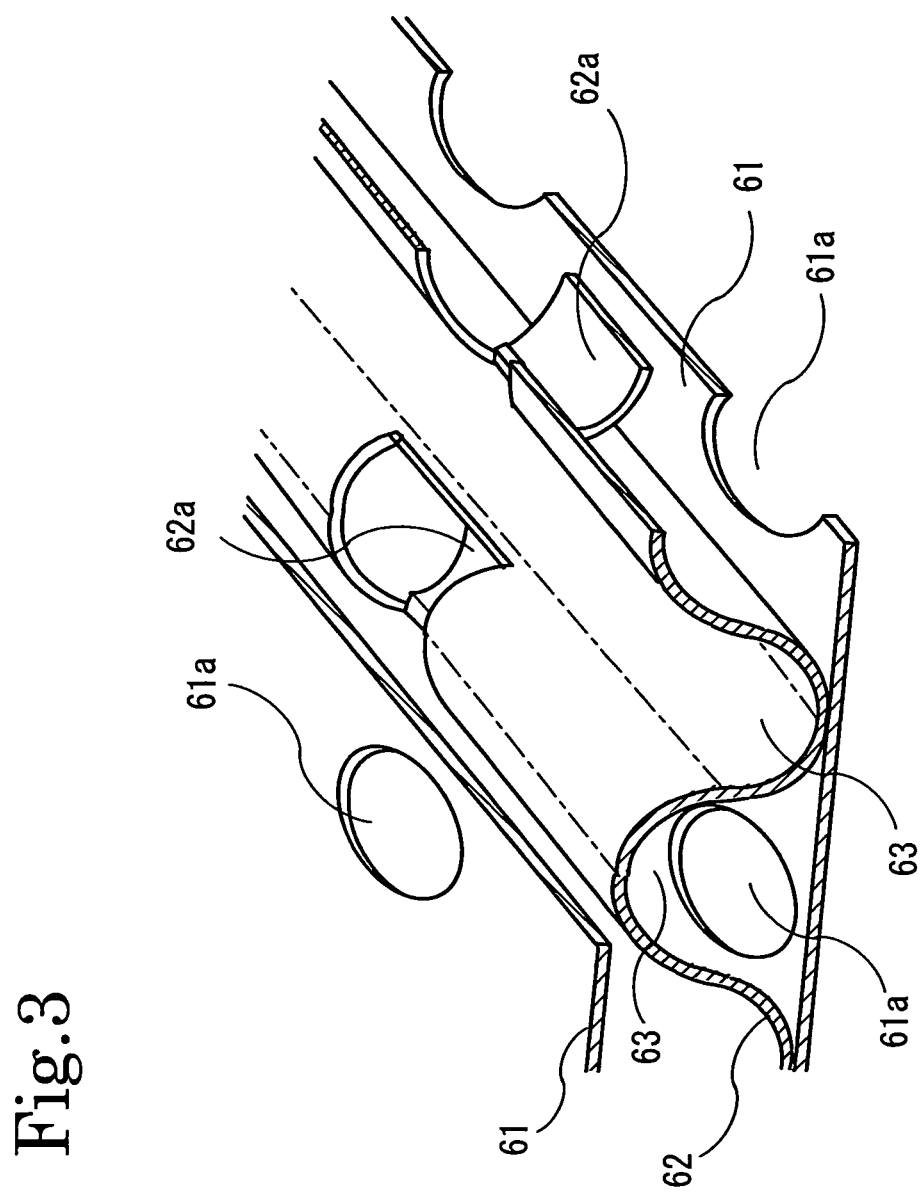
FIG. 3 a view schematically showing a longitudinal structure ("LS") in which perforated flat foils and corrugated foils having nicks are stacked on each other.

Meanwhile, in the LS structure, flat foils 61 made of a metal and provided with openings and corrugated foils 62 made of a metal and provided with nicks (depressed portions) 62A in a corrugated portion are stacked with each other as shown in FIG. 3, so that the channels 63 can communicate with each other. The nicks 62a in the LS structure form the corrugation in a direction perpendicular to the axis of the channels. When a cylindrical shape is formed of the PE structure and the LS structure, a structure obtained by stacking the flat foils 51 and 61 and the corrugated foils 52 and 62 together is rolled up into a cylindrical shape.

When an unburned fuel such as HCs (hydrocarbons) or CO (carbon monoxide) exists in exhaust gas, the oxidation catalyst 31 oxidizes the unburned fuel. Heat generated by the oxidation raises the temperature of the oxidation catalyst 31 itself and the temperature of exhaust gas passing therethrough. The exhaust gas whose temperature has been raised raises the temperature of the NOx occlusion/reduction type catalyst 32 and the temperature of the catalyzed DPF 33 which are located on the downstream side.

This configuration enables the system for exhaust gas purification 1 including, in the following order from the upstream side of the exhaust passage 11 of the engine (internal combustion engine) 10, a device for direct injection 47 into the exhaust passage 11, the oxidation catalyst 31, and at least one of the catalyst for NOx removal 32 and the catalyzed DPF 33 to have a configuration in which a support of the oxidation catalyst 31 is formed of a metallic material or a material having a specific heat not higher than that of a metallic material into a structure having a mixing function for exhaust gas. With an emphasis placed on temperature rise performance, the capacity of the oxidation catalyst 31 is made as small as possible within a range where the increase in exhaust pressure is small. A standard for the capacity is S/V=300,000 hr$^{-1}$ with respect to a rated exhaust flow. If the capacity of the oxidation catalyst is large, the temperature is difficult to be raised. Meanwhile, if the capacity is small, the activity is insufficient.

The NOx occlusion/reduction type catalyst 32 is one of catalysts called lean NOx traps (LNT). This catalyst 32 is constituted by providing a porous catalyst coat layer formed of aluminum oxide (alumina) or the like on a support of a honeycomb structure or the like of a porous ceramic, such as a cordierite honeycomb. A catalytic noble metal such as platinum and a NOx occlusion substance having a NOx occlusion function are supported on the catalyst coat layer. As the NOx occlusion substance, one or a combination of several kinds of alkali metals such as potassium, sodium, lithium, and cesium, alkaline earth metals such as barium and calcium, and rare earths such as lanthanum and yttrium can be used.

The NOx occlusion/reduction type catalyst 32 removes NOx by oxidizing NO (nitrogen monoxide) in oxygen-rich exhaust gas into a nitrate which is then adsorbed on the catalyst. The NOx occlusion/reduction type catalyst 32 occludes NOx in a state where the air-fuel ratio of the exhaust gas is lean. Meanwhile, in a state where the air-fuel ratio is rich, the NOx occlusion/reduction type catalyst 32 releases the occluded NOx, and reduces the released NOx in a reducing atmosphere. Thus the catalyst reduces the amount of NOx. In other words, the NOx occlusion/reduction type catalyst 32 exhibits two functions of the NOx occlusion and the NOx release and removal, depending on the oxygen concentration in the exhaust gas and the like.

The catalyzed DPF (diesel particulate filter) 33 is formed of a monolithic honeycomb-type wall-flow filter in which channels (cells) of a porous ceramic honeycomb are blocked alternately at inlets and at outlets. The oxidation catalyst and the PM oxidation catalyst are supported on wall surfaces of the porous ceramic and in the inside thereof. The oxidation catalyst is formed of platinum, palladium, or the like. The PM oxidation catalyst is formed of an oxidation catalyst of an oxide such as cerium oxide.

Meanwhile, an intake passage 14 is provided with an air filter 15, a mass air flow sensor (MAF sensor) 16, a compressor 12b of the turbocharger 12, an intercooler 17, and an intake throttle valve 18. Moreover, an exhaust gas recirculation ("EGR") passage 19 connecting an exhaust manifold 10a and an intake manifold 10b is provided with an EGR cooler 20 and an EGR valve 21.

Meanwhile, the exhaust passage 11 is provided with an air-fuel ratio (A/F) sensor 41 which is located on the upstream side of the exhaust gas purification apparatus 30, and which detects the air-fuel ratio of exhaust gas for controlling the air-fuel ratio of the exhaust gas. In addition, in order to estimate the temperatures of the catalysts 31 and 32, and the temperature of the catalyzed DPF 33, a first temperature sensor 42 is disposed on the upstream side of the oxidation catalyst 31, a second temperature sensor 43 is disposed between the oxidation catalyst 31 and the NOx occlusion/reduction type catalyst 32, a third temperature sensor 44 is disposed between the NOx occlusion/reduction type catalyst 32 and the catalyzed filter 33, and a fourth temperature sensor 45 is disposed on the downstream side of the catalyzed filter 33. Moreover, a NOx sensor 46 is disposed on the downstream side of the exhaust gas purification apparatus 30.

In addition, for conducting in-exhaust pipe direct injection of fuel, the device for direct injection into the exhaust pipe (in-exhaust pipe fuel injection valve) 47 is provided to the exhaust passage (exhaust pipe) 11 on the upstream side of the exhaust gas purification apparatus 30. The device for direct injection into the exhaust pipe 47 supplies unburned HCs, which is the fuel, to the exhaust passage 11 by direct injection during the air-fuel ratio rich control in each control. The air-fuel ratio rich control may be performed on control for raising the temperature of the oxidation catalyst 31, control for raising the temperature of exhaust gas passing through the oxidation catalyst 31, regeneration control by NOx removal for restoring the NOx occlusion capacity of the NOx occlusion/reduction type catalyst 32, forced regeneration control by PM removal for removing PMs collected on the catalyzed DPF 33 by forced combustion, and the like.

In the diesel engine 10, air A is purified through the air filter 15, measured for the mass flow rate with the mass air flow sensor (MAF sensor) 16, and pressurized with a compressor 10b. Thereafter, the air A is cooled with the intercooler 17, passes through the intake throttle valve 18, and enters the intake manifold 10b. The intake throttle valve 18 adjusts the flow rate of the air A. Fuel is injected into the air A in a cylinder of the engine 10, and the fuel is combusted.

Exhaust gas G generated by the combustion passes through the exhaust manifold 10a, drives a turbine 10a on the exhaust passage 11, and then passes through the exhaust gas purification apparatus 30, to thereby be purified exhaust gas Gc. Thereafter, the purified exhaust gas Gc passes through the exhaust throttle valve 13 and through an unillustrated muffler (sound absorber), and is then emitted to the atmosphere. In addition, a part of the exhaust gas G is cooled with the EGR cooler 20 on the EGR passage 19, then passes through the EGR valve 21, enters the intake manifold 10b as EGR gas Ge, is mixed with the air A, and enters the cylinder. The EGR valve 21 adjusts the flow rate of the EGR gas Ge.

In addition, an exhaust gas purification control unit 40a is provided for controlling the system for exhaust gas purification 1. Generally, the exhaust gas purification control unit 40a is constructed in a state of being included in an engine control unit (ECU) 40 which controls the entire engine. The exhaust gas purification control unit 40a receives inputs of an engine revolution number, a fuel injection amount (or load), and the like, in addition to inputs from the air-fuel ratio sensor 41, the first to fourth temperature sensors 42, 43, 44, and 45, the NOx sensor 46, and the like. In addition, the exhaust gas purification control unit 40a has a close relationship with the engine control unit 40, and causes the engine control unit 40 to control the in-cylinder fuel injection, the exhaust throttle valve 13, the intake throttle valve 18, the EGR valve 21, the device for direct injection into the exhaust pipe 47, and the like.

Figure 4:
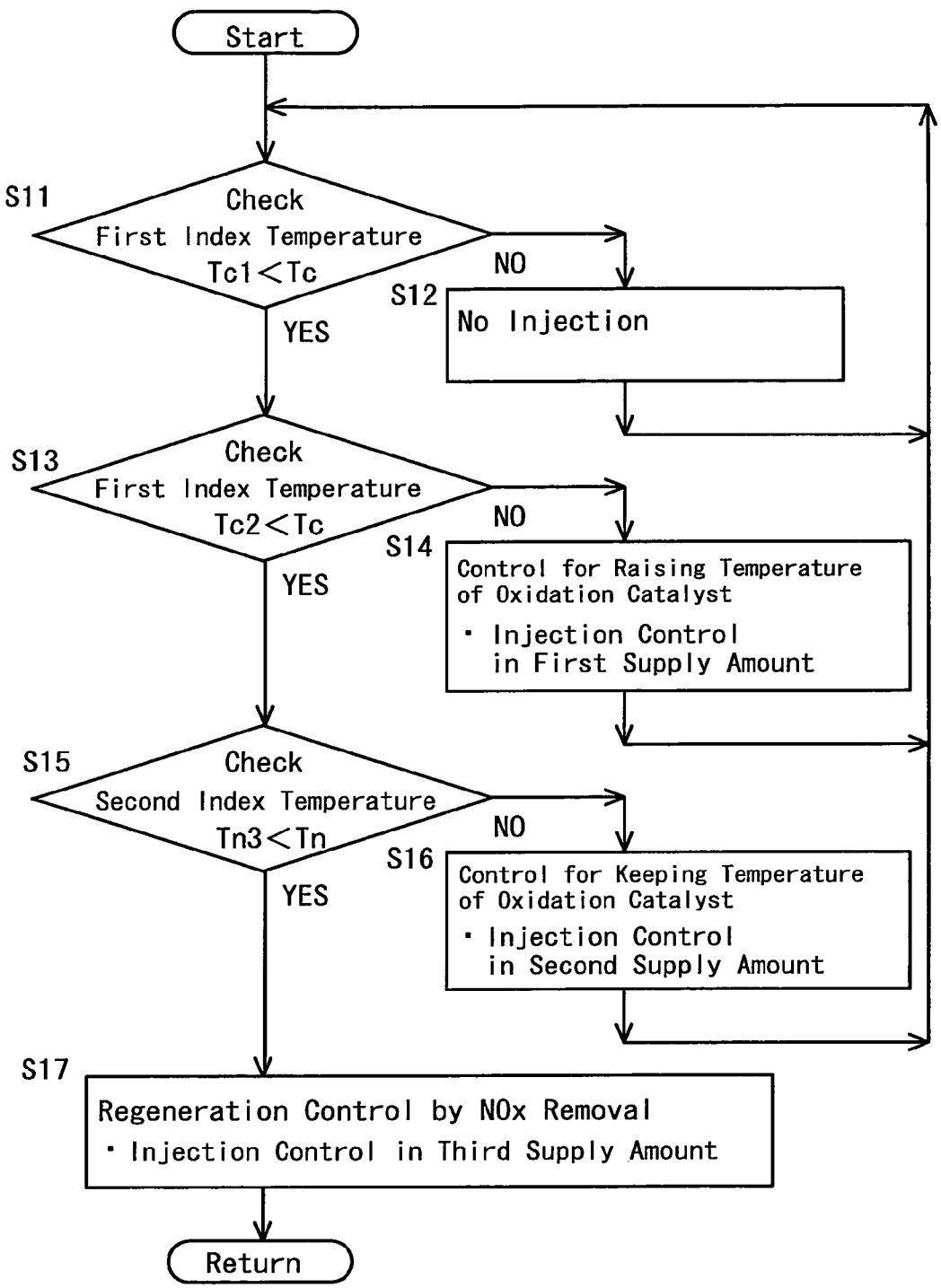
FIG. 4 is a diagram showing one example of a control flow related to regeneration by NOx removal in a method of controlling a system for exhaust gas purification of the embodiment according to the present invention.
Figure 5:
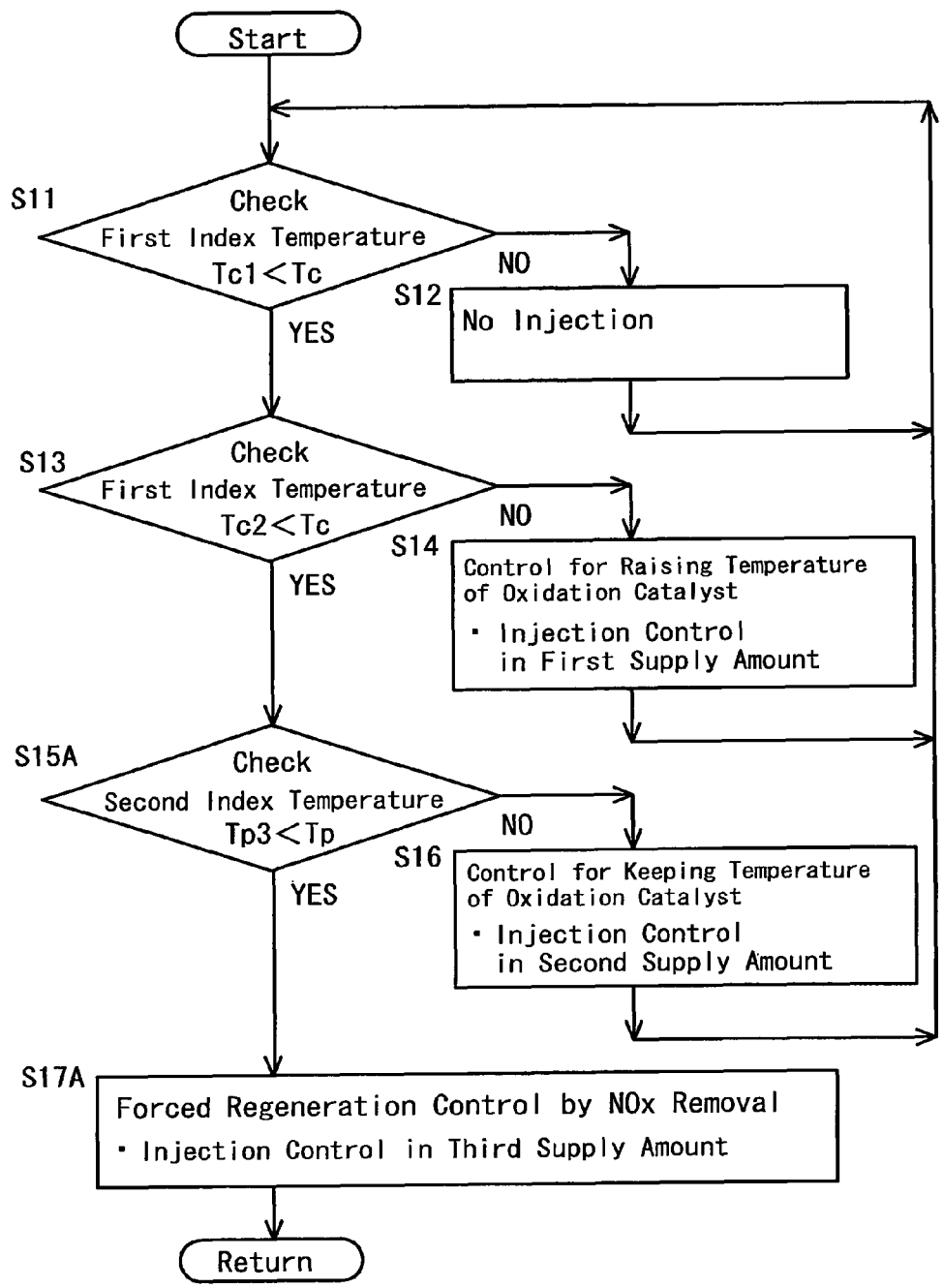
FIG. 5 is a diagram showing one example of a control flow related to forced regeneration by PM removal in the method of controlling a system for exhaust gas purification of an embodiment according to the present invention

Next, description will be made of an exhaust gas purification system control method of the system for exhaust gas purification 1. The control method is conducted in accordance with control flows exemplified in FIGS. 4 and 5. The control flow in FIG. 4 is a control flow for regeneration by NOx removal for restoring the NOx occlusion capacity of the NOx occlusion/reduction type catalyst 32. The control flow in FIG. 5 is a control flow for forced regeneration by PM removal for removing PMs collected on the catalyzed DPF 33 by forced combustion.

First, description will be given of the control flow in FIG. 4 for regeneration of the NOx occlusion/reduction type catalyst 32 by NOx removal. The control flow in FIG. 4 is selected and starts to be executed when a higher control flow determines that the amount of NOx occluded is increased to some extent, and the regeneration control by NOx removal for restoring the NOx occlusion capacity of the NOx occlusion/reduction type catalyst 32 is allowed to be performed. The higher control flow is a main control flow for performing the general control of the engine along with the start of the engine, or the like. In the control flow in FIG. 4, when the termination of operation of the engine, such as the turning off of an engine key, is detected, the process is interrupted, and returns to the higher control flow. The control flow is terminated along with the termination of the main control flow. Note that when the amount of NOx occluded is so large that the amount may exceed a limit, the regeneration by NOx removal is performed not by the control flow in FIG. 4, but by another control flow (not illustrated).

Once the control flow in FIG. 4 is selected in the higher control flow, and starts to be executed, it is first determined in Step S11 whether or not a first index temperature Tc indicative of the temperature of the oxidation catalyst 31 is above a predetermined first judgment temperature Tc1. Since the direct measurement of the temperature of the oxidation catalyst 31 is difficult, a temperature detected with the first temperature sensor 42 on the upstream side or a temperature detected with the second temperature sensor 43 on the downstream side is used as the first index temperature Tc instead of a directly measured temperature of the oxidation catalyst 31. Alternatively, an average of these temperatures may be used. As this first judgment temperature Tc1, a temperature at which the temperature of the oxidation catalyst 31 becomes at a catalyst activation temperature (for example, 200° C.) is employed.

If the determination in Step S11 is that the first index temperature Tc is not higher than the predetermined first judgment temperature Tc1 (NO), the process goes to the Step S12 where no fuel is injected from the device for direct injection into the exhaust pipe 47, and the process returns to Step S11 after a predetermined time (a time associated with intervals of checking of the first index temperature Tc1) has elapsed. Meanwhile, if the determination in Step S11 is that the first index temperature Tc is above the predetermined first judgment temperature Tc1 (YES), the process goes to Step S13 where it is determined whether or not the first index temperature Tc is above a predetermined second judgment temperature Tc2. As the second judgment temperature Tc2, employed is a temperature at which the temperature of the oxidation catalyst 31 is substantially surely kept not lower than the catalyst activation temperature, and at which a catalyst temperature enough to prevent generation of white smoke, which is emission of an unburned fuel to the atmosphere, is achieved (for example, 220° C.).

If determination in Step S13 is that the first index temperature Tc is not higher than the predetermined second judgment temperature Tc2 (NO), the process goes to Step S14 where control for raising the temperature of the oxidation catalyst 31 is performed for a predetermined time (a time associated with intervals of checking of the first index temperature Tc), and injection control is performed in a predetermined first supply amount, so that fuel is injected from the device for direct injection into the exhaust pipe 47. Thereafter, the process returns to Step S11.

Figure 7:
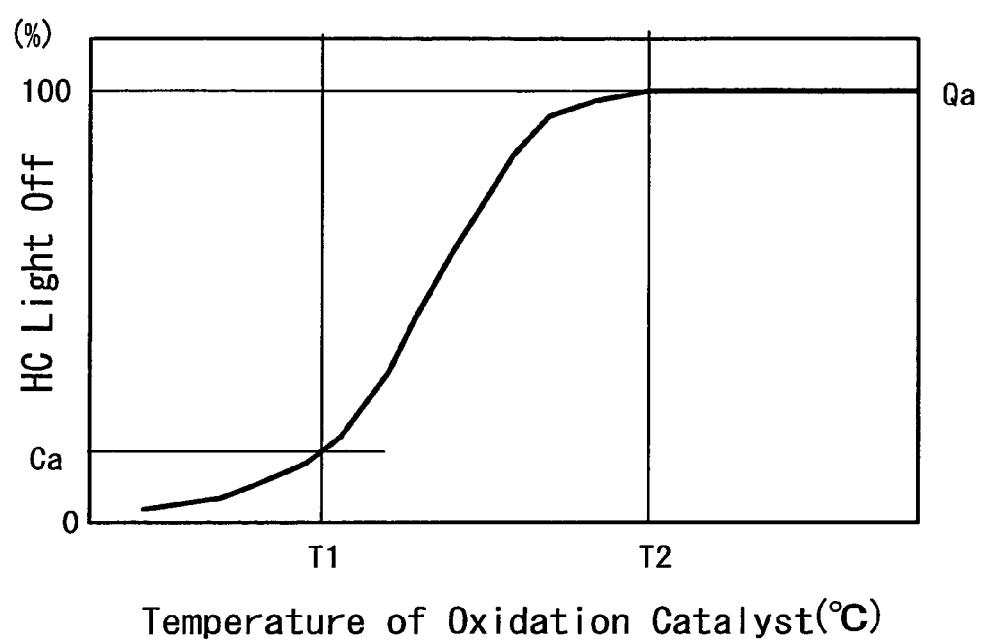
FIG. 7 is a graph schematically showing the relationship between the temperature of an oxidation catalyst and HC light-off.

The predetermined first supply amount is an amount for raising the temperature of the oxidation catalyst 31 itself so that the temperature of the oxidation catalyst 31 can be continuously kept not lower than the activation temperature (for example, 200° C.). The predetermined first supply amount is employed until the first index temperature Tc reaches the second judgment temperature Tc2. The control is performed for raising the temperature of the oxidation catalyst 31. Since the temperature of exhaust gas is still low at the time of this control, injection with a large amount causes white smoke. For this reason, supply amounts commensurate with temperatures and flow rates of exhaust gas are determined in advance, and stored in the exhaust gas purification control unit 40a as map data or the like. The supply amount is calculated at the time of implementation with reference to the data on the first supply amount. Specifically, an injectable amount Qb (=Qa× Ca/100) at a current temperature T1 is found from the characteristic curve of FIG. 7, where Qa represents an injection amount oxidizable at a temperature (T2) at which the HC light-off is 100% as shown in FIG. 7.

If the determination in Step S13 is that the first index temperature Tc is above the predetermined second judgment temperature Tc2 (YES), the process goes to Step S15 where it is determined whether or not a second index temperature Tn for regeneration by NOx removal is above a predetermined third judgment temperature Tn3 for regeneration by NOx removal. Since the direct measurement of the temperature of the NOx occlusion/reduction type catalyst 32 is difficult, a temperature detected with the second temperature sensor 43 on the upstream side or a temperature detected with the third temperature sensor 44 on the downstream side is used as the second index temperature Tn instead of a directly measured temperature of the NOx occlusion/reduction type catalyst 32. Alternatively, an average of these temperatures may be used. As this third judgment temperature Tn3, a temperature at which the temperature of the NOx occlusion/reduction type catalyst is at a catalyst activation temperature of the NOx occlusion/reduction type catalyst 32 (for example, 250° C.) is employed.

If the determination in Step S15 is that the second index temperature Tn is not higher than the predetermined third judgment temperature Tn3 (NO), the process goes to Step S16 where control for keeping the temperature of the oxidation catalyst 31 is performed for a predetermined time (a time associated with intervals of checking of the second index temperature Tn), and injection control is performed in a predetermined second supply amount, so that fuel is injected from the device for direct injection into the exhaust pipe 47. Thereafter, the process returns to Step S11.

In Step S16, unburned fuel is supplied in the predetermined second supply amount, which is different from the first supply amount. The predetermined second supply amount is an amount for raising the temperature of the exhaust gas so that the temperature of the NOx occlusion/reduction type catalyst 32 on the downstream side can be raised with the oxidation catalyst 31 being continuously kept at a temperature not lower than the activation temperature (for example, 200° C.). The second supply amount is set to be enough to raise the temperatures of the exhaust gas and the NOx occlusion/reduction type catalyst 32. The control is performed for keeping the temperature of the oxidation catalyst 31. Since the temperature of the exhaust gas is relatively high at this time, the unburned fuel is supplied in the second supply amount, which is different from the first supply amount. For this reason, in this state, supply amounts commensurate with temperatures and flow rates of exhaust gas are determined in advance, and stored in the exhaust gas purification control unit 40a as map data or the like. The supply amount is calculated at the time of implementation with reference to the data for the second supply amount. Specifically, the second supply amount is found in accordance with a characteristic curve as shown in FIG. 7, as in the case of the first supply amount.

If the determination in Step S15 is that the second index temperature Tn is above the predetermined the third judgment temperature Tn3 (YES), the process goes to Step S17 where air-fuel ratio control for regeneration control by NOx removal is performed, so that fuel is injected from the device for direct injection into the exhaust pipe 47 in a predetermined third supply amount for regeneration by NOx removal. The control is performed for regeneration of the NOx occlusion/reduction type catalyst 32 by NOx removal. Since the temperature of the exhaust gas at the time of this control is sufficiently high, supply amounts suitable for the regeneration by NOx removal and commensurate with flow rates of exhaust gas are determined in advance, and stored in the exhaust gas purification control unit 40a as map data or the like. The supply amount is calculated at the time of implementation with reference to the data for the third supply amount for regeneration by NOx removal. Note that, during the regeneration by NOx removal, EGR control, intake throttle control, exhaust throttle control, in-cylinder fuel injection control, or the like is performed in parallel, as necessary.

Then, this Step S17 is continued until the regeneration by NOx removal is completed. When the regeneration by NOx removal is completed, the process returns to the higher control flow. After the returning to the higher control flow, the control flow in FIG. 4 is selected again and executed when the amount of NOx occluded is again increased to some extent, and when it is determined that the NOx regeneration control for restoring the NOx occlusion capacity of the NOx occlusion/reduction type catalyst 32 is allowed to be performed. This is repeated as needed.

Next, a control flow in FIG. 5 for forced regeneration of the catalyzed DPF 33 by PM removal will be described. The control flow in FIG. 5 is selected and starts to be executed when a higher control flow determines that the amount of PMs collected is increased to some extent and the forced regeneration control by PM removal for removing PMs collected on the catalyzed DPF 33 by forced combustion is allowed to be performed. The higher control flow is a main control flow for performing the general control of the engine along with the start of the engine, or the like. When the termination of operation of the engine, such as the turning off of an engine key, is detected, the process is interrupted, and returns to the higher control flow. The control flow is terminated along with the termination of the main control flow. The control flow of FIG. 5 is identical to the control flow in FIG. 4, except that Steps S15 and S17 in the control flow in FIG. 4 are replaced with Steps S15A and S17A, respectively. Note that when the amount of PMs deposited is so large that the amount may exceed a limit, the forced regeneration by PM removal is performed not by the control flow in FIG. 5, but by another control flow (not illustrated).

Once the control flow in FIG. 5 is selected in the higher control flow, and starts to be executed, Steps S11 to S14 and S16 are performed as in the case of the control flow in FIG. 4. In Step S15A in the control flow in FIG. 5, it is determined whether or not a second index temperature Tp for forced regeneration by PM removal is above a predetermined third judgment temperature Tp3 for forced regeneration by PM removal. Since the direct measurement of the temperature of the catalyzed DPF 33 is difficult, a temperature detected with the third temperature sensor 44 on the upstream side or a temperature detected with the fourth temperature sensor 45 on the downstream side is used as the second index temperature Tp instead of a directly measured temperature of the catalyzed DPF 33. Alternatively, an average of these temperatures may be used. As the third judgment temperature Tp3, employed is a temperature at which the temperature of the catalyzed DPF 33 becomes a temperature at which the combustion of the PMs is started (for example, 300° C.).

If the determination in Step S15A is that the second index temperature Tp is not higher than the predetermined third judgment temperature Tp3 (NO), the process goes to Step S16 where control for keeping the temperature of the oxidation catalyst 31 is performed for a predetermined time (a time associated with intervals of checking of the second index temperature Tp), and injection control is performed in the predetermined second supply amount, so that fuel is injected from the device for direct injection into the exhaust pipe 47. Thereafter, the process returns to Step S11.

If the determination in Step S15A is that the second index temperature Tp is above the predetermined third judgment temperature Tp3 (YES), the process goes to Step S17A where air-fuel ratio control for forced regeneration control by PM removal is performed, so that fuel is injected from the device for direct injection into the exhaust pipe 47 in a predetermined third supply amount for forced regeneration by PM removal. The control is performed for forced regeneration of the catalyzed DPF 33 by PM removal. Since the temperature of the exhaust gas at the time of this control is sufficiently high, supply amounts suitable for the forced regeneration by PM removal and commensurate with flow rates of exhaust gas are determined in advance, and stored in the exhaust gas purification control unit 40a as map data or the like. The supply amount is calculated at the time of implementation with reference to the data on the third supply amount for forced regeneration by PM removal. Note that, during the forced regeneration by PM removal, EGR control, intake throttle control, exhaust gas throttle control, in-cylinder fuel injection control, or the like is performed in parallel, as necessary.

Then, this Step S17A is continued until the forced regeneration by PM removal is completed. When the forced regeneration by PM removal is completed, the process returns to the higher control flow. After the returning to the higher control flow, the control flow in FIG. 5 is selected again and executed when the amount of PMs collected is increased to some extent, and when it is determined that the forced regeneration control by PM removal for removing PMs collected on the catalyzed DPF 33 by forced combustion is allowed to be performed. This is repeated as needed.

In the control flows in FIGS. 4 and 5, a temperature at which the temperature of the oxidation catalyst 31 becomes 200° C. is employed as the first judgment temperature Tc1, and a temperature at which the temperature of the oxidation catalyst 31 becomes 220° C. is employed as the second judgment temperature Tc2. In addition, as the third judgment temperature Tn3 for regeneration by NOx removal, a temperature at which the temperature of the NOx occlusion/reduction type catalyst 32 becomes 250° C. is employed, or as the third judgment temperature for forced regeneration by PM removal, a temperature at which the temperature of the catalyzed DPF 33 becomes 300° C. is employed. Thereby, the judgment temperatures are set at appropriate values, and the temperature raise of the oxidation catalyst 31, and the temperature raise of the exhaust gas, as well as the regeneration by NOx removal or the forced regeneration by PM removal, are efficiently performed.

With these kinds of control, in the method of controlling the system for exhaust gas purification 1 which includes in the following order from the upstream side of the exhaust passage 11 of the engine (internal combustion engine) 10: the device for direct injection into the exhaust pipe 47, the oxidation catalyst 31, and at least one of the catalyst for NOx removal 32 and the catalyzed DPF 33, and in which the support of the oxidation catalyst 31 is formed of a metallic material or a material having a specific heat not higher than that of a metallic material into a structure having a mixing function of exhaust gas, the following can be performed. Specifically, when the first index temperature Tc indicative of the temperature of the oxidation catalyst 31 is above the first judgment temperature Tc1, in-exhaust pipe direct injection can be performed in the predetermined first supply amount for raising the temperature of the oxidation catalyst 31; when the first index temperature Tc is above the second judgment temperature Tc2, in-exhaust pipe direct injection can be performed in the predetermined second supply amount for raising the temperature of the exhaust gas; and when the second index temperature Tn (or Tp) indicative of the temperature of the NOx occlusion/reduction type catalyst 32 (or the catalyzed DPF 33) reaches the third judgment temperature Tn3 (or Tp3), in-exhaust pipe direct injection can be performed in the predetermined third supply amount for performing the NOx removal (or the forced regeneration by PM removal).

Figure 6:
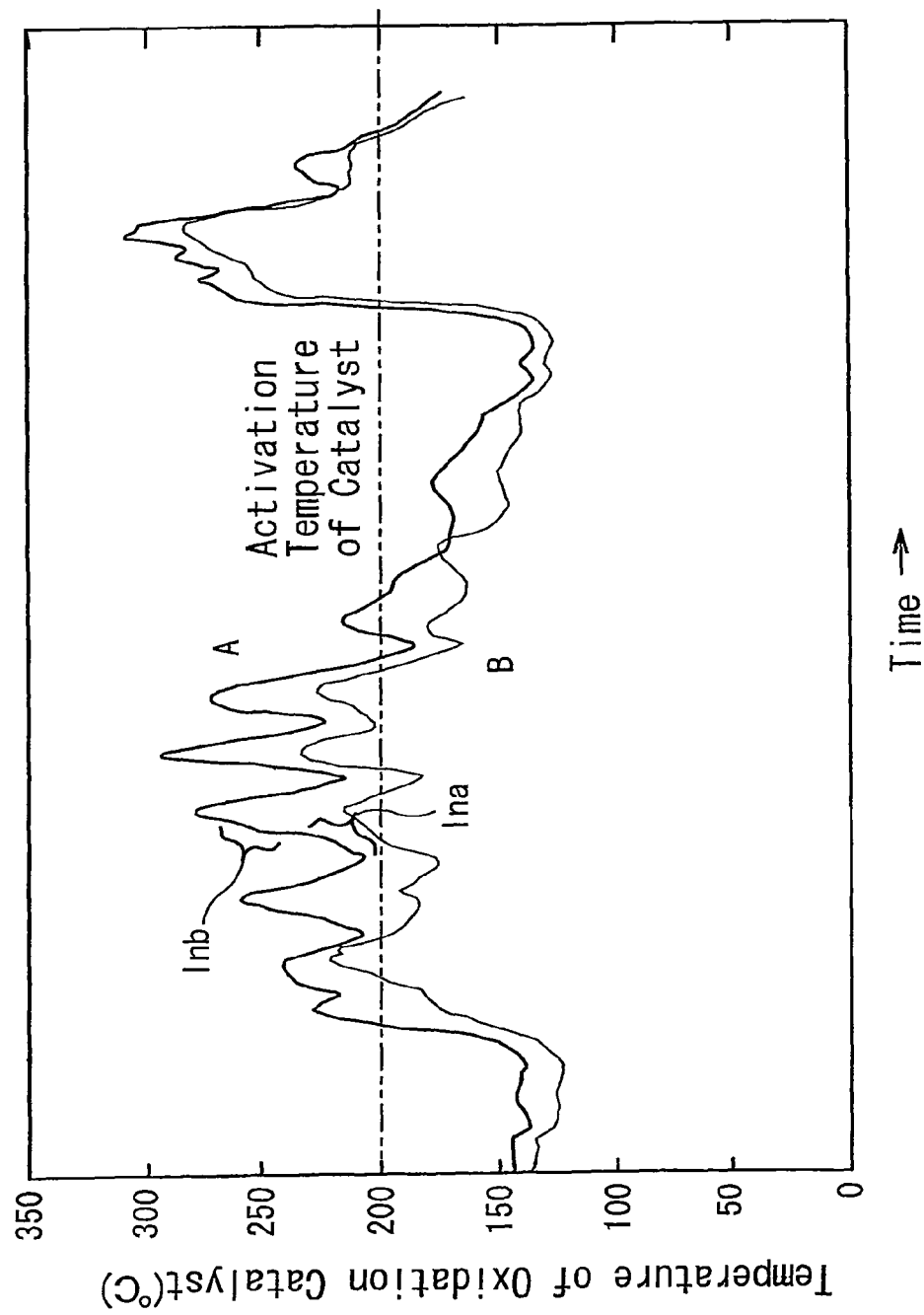
FIG. 6 is a chart in which the temperature of exhaust gas at an outlet of an oxidation catalyst during driving in a case of an oxidation catalyst of Example having a metallic material support is compared with that in a case of an oxidation catalyst of Conventional Example having a cordierite support.

FIG. 6 shows, for comparison, changes in temperature of exhaust gas at an outlet of an oxidation catalyst in Example A where a oxidation catalyst 31 having a support formed of a metallic material or a material having a specific heat not higher than that of a metallic material into a structure having a function of mixing exhaust gas was used, and in Conventional Example B where an oxidation catalyst formed of a cordierite support having a relatively high specific heat was used, respectively. Ina represents a region where in-exhaust pipe direct injection is being performed in a small amount for raising the temperature, and Inb represents a region where in-exhaust pipe direct injection is performed for regeneration by NOx removal.

In the case of Conventional Example B, since the amplitude of change in temperature, which follows the rise and drop of the temperature of exhaust gas in a slow acceleration state, of the oxidation catalyst is small, an acceleration state of a certain degree is necessary for the temperature of the oxidation catalyst to reach the activation temperature of the catalyst (for example, 200° C.). Meanwhile, in Example A, since the amplitude of change in temperature, which follows the rise and drop of temperature of exhaust gas in a slow acceleration state, of oxidation catalyst is great, a case where the oxidation catalyst reaches the activation temperature of the catalyst is more likely occur although the period is short. For this reason, the temperature of the oxidation catalyst can be kept not lower than the activation temperature of the catalyst by supplying unburned fuel at this timing. As a result, it is possible to raise the temperatures of exhaust gas, the NOx occlusion/reduction type catalyst, and the catalyzed DPF even when the operation condition of the internal combustion engine is a low-load condition.

Accordingly, the above-described system for exhaust gas purification 1 using at least one of the catalyst for NOx removal 32 and the catalyzed DPF 33 and the method of controlling the same makes it possible to perform regeneration by NOx removal and forced regeneration by PM removal even in a case of a low-load driving operation, and to implement regeneration by NOx removal or forced regeneration by PM removal in wider operation regions.

The above-described system for exhaust gas purification and method of controlling the same of the present invention having the excellent effects can be used extremely effectively for a system for exhaust gas purification which is provided to an internal combustion engine or the like mounted on a vehicle, and which has at least one of a NOx occlusion/reduction type catalyst and a catalyzed DPF.

What is claimed is:

1. A system for exhaust gas purification, comprising, in the following order from an upstream side of an exhaust passage of an internal combustion engine:
    a device for direct injection into an exhaust pipe;
    an oxidation catalyst;
    at least one of a catalyst for NOx removal and a catalyzed diesel particulate filter,
    wherein a support of the oxidation catalyst is formed of a metallic material or a material having a specific heat not higher than that of a metallic material into a structure having a function of mixing exhaust gas;
    an exhaust gas purification control unit which performs:
        in-exhaust pipe direct injection in a predetermined first supply amount for raising a temperature of the oxidation catalyst when a first index temperature indicative of a temperature of the oxidation catalyst is above a first judgment temperature;
        in-exhaust pipe direct injection in a predetermined second supply amount for raising a temperature of the exhaust gas when the first index temperature is above a second judgment temperature; and
        in-exhaust pipe direct injection in a predetermined third supply amount for performing a corresponding one of regeneration by NOx removal and forced regeneration by particulate matter removal when a second index temperature indicative of a temperature of the at least one catalyst for NOx removal and the catalyzed diesel particulate filter reaches a third judgment temperature.

2. The system for exhaust gas purification according to claim 1, wherein the exhaust gas purification control unit employs:
    a temperature at which the temperature of the oxidation catalyst becomes 200° C. as the first judgment temperature;
    a temperature at which the temperature of the oxidation catalyst becomes 220° C. as the second judgment temperature; and
    for the regeneration by NOx removal, a temperature at which the temperature of the catalyst for NOx removal becomes 250° C. as the third judgment temperature, or for the forced regeneration by particulate matter removal, a temperature at which the temperature of the catalyzed diesel particulate filter becomes 300° C. as the third judgment temperature.

3. A method of controlling a system for exhaust gas purification which includes, in the following order from an upstream side of an exhaust passage of an internal combustion engine, a device for direct injection into an exhaust pipe, an oxidation catalyst, and at least one of a catalyst for NOx removal and a catalyzed diesel particulate filter, comprising:
    using a support of the oxidation catalyst formed of a metallic material or a material having a specific heat not higher than that of a metallic material into a structure having a function of mixing exhaust gas;
    performing in-exhaust pipe direct injection in a predetermined first supply amount for raising a temperature of the oxidation catalyst when a first index temperature indicative of a temperature of the oxidation catalyst is above a first judgment temperature;
    performing in-exhaust pipe direct injection in a predetermined second supply amount for raising a temperature of the exhaust gas when the first index temperature is above a second judgment temperature; and
    performing in-exhaust pipe direct injection in a predetermined third supply amount for performing a corresponding one of regeneration by NOx removal and forced regeneration by particulate matter removal when a second index temperature indicative of a temperature of the at least one of the catalyst for NOx removal and the catalyzed diesel particulate filter reaches a third judgment temperature.

4. The method of controlling a system for exhaust gas purification according to claim 3,
    wherein a temperature at which the temperature of the oxidation catalyst becomes 200° C. is employed as the first judgment temperature,
    a temperature at which the temperature of the oxidation catalyst becomes 220° C. is employed as the second judgment temperature, and
    for the regeneration by NOx removal, a temperature at which the temperature of the catalyst for NOx removal becomes 250° C. is employed as the third judgment temperature, or for the forced regeneration by particulate removal, a temperature at which the temperature of the catalyzed diesel particulate filter becomes 300° C. is employed as the third judgment temperature.

* * * * *